United States Patent [19]
Shy

[11] Patent Number: 6,024,496
[45] Date of Patent: Feb. 15, 2000

[54] SHAFT COUPLING ARRANGEMENT INCLUDING OIL SLEEVE BEARING AND OIL SUPPLY

[75] Inventor: Alex Shy, Taoyuan Shien, Taiwan

[73] Assignee: Delta Electronics, Inc., Taoyuan Shien, China

[21] Appl. No.: 09/003,127

[22] Filed: Jan. 6, 1998

[51] Int. Cl.[7] .............................. F16C 33/02; F16C 33/10; B25G 3/18
[52] U.S. Cl. ........................... 384/279; 384/286; 403/326
[58] Field of Search .................................... 384/279, 286, 384/397, 322, 415, 902; 277/566, 649; 403/326, 329

[56] References Cited

U.S. PATENT DOCUMENTS

| | | | |
|---|---|---|---|
| 3,104,884 | 9/1963 | Kerlin ....................................... | 277/566 |
| 4,093,323 | 6/1978 | Quandt et al. ....................... | 384/279 X |
| 4,820,140 | 4/1989 | Bishop ................................. | 384/279 X |
| 5,145,266 | 9/1992 | Saneshige et al. ...................... | 384/322 |
| 5,281,035 | 1/1994 | Lo .......................................... | 384/279 |
| 5,441,386 | 8/1995 | Hsieh .................................. | 384/279 X |
| 5,829,906 | 11/1998 | Gabas Cebollero ................ | 403/326 X |

*Primary Examiner*—Tamara L. Graysay
*Assistant Examiner*—Brandon C. Stallman
*Attorney, Agent, or Firm*—Finnegan, Henderson, Farabow, Garrett & Dunner, L.L.P.

[57] ABSTRACT

An oil sleeve bearing device for holding a shaft of a motor in a motor base and permitting smooth revolving of the shaft therein is disclosed. The oil sleeve bearing device includes a sleeve bearing for holding the shaft, a bearing holder for supporting the sleeve bearing, and a securing member for positioning the sleeve bearing and the shaft in the bearing holder, and there exists a room among the sleeve bearing, the bearing holder, and the securing member for storing oil which can be supplied to the sleeve bearing for lubrication. A buckle structure of the securing member is also disclosed so as to allow the sleeve bearing and the shaft to be easily secured to the bearing holder.

21 Claims, 4 Drawing Sheets

SHAFT COUPLING ARRANGEMENT INCLUDING OIL SLEEVE BEARING AND OIL SUPPLY

FIELD OF THE INVENTION

The present invention is related to an oil sleeve bearing, and more particularly to an oil sleeve bearing adapted to be used in a brush-free direct-current fan, which has an oil-storing room to supply oil and is easy to be combined with a shaft of the fan.

BACKGROUND OF THE INVENTION

In the earlier stage, the bearing used in a motor for holding a shaft is a ball bearing. As known to those skilled in the art, the cost of ball bearings is relatively high. Consequently, an oil sleeve bearing is developed to reduce the cost. Oil sleeve bearings are generally made of copper-based material which has tiny pores inside so that oil can be contained therein and introduced to the shaft owing to a capillary effect to lubricate the shaft. Attributed to low cost, oil sleeve bearings are popularly used in small motors.

As interpreted literally, an oil sleeve bearing holds the shaft around, and facilitates the smooth revolving of the shaft by lubrication with oil. If the oil contained in the bearing is inefficient for lubrication, the bearing cannot work any more. Unfortunately, oil is subject to evaporation and leakage so as to adversely effect the lifespans of conventional oil sleeve bearings.

In addition, complicated steps are generally required for combining the shafts of the motors with the conventional oil sleeve bearings. One of the examples is shown in FIG. 1 which is a schematic diagram of a conventional brush-free DC fan. The fan shown in FIG. 1 includes a vane portion 1 having a shaft 13 centrally located, an oil sleeve bearing 3 engaged with the shaft 13 for holding it and allowing the shaft 13 to smoothly revolve therein, and a base 5 for stabilizing the entire fan structure. When assembled, the sleeve bearing 3 is mounted into the base 5 from an opening 53 of the base 5, and the shaft 13 enters the base 5 and penetrates through a central hollow portion 31 of the sleeve bearing 3. Subsequently, a fixing ring 6 is engaged with the threaded end portion 14 of the shaft 13 through the opening 53 to secure the entire structure.

SUMMARY OF THE INVENTION

An object of the present invention is to provide an oil sleeve bearing device, which includes an oil-storing room to supply oil for the bearing wall in contact with the shaft so as to lengthen its lifespan.

Another object of the present invention is to provide an oil sleeve bearing device, which is easy to be combined with the shaft by buckling means.

The present invention is related to an oil sleeve bearing device for holding a shaft of a motor in a motor base and permitting smooth revolving of the shaft therein.

According to a first aspect of the present invention, the oil sleeve bearing device includes a sleeve bearing having a first hollow portion for allowing the shaft to penetrate therethrough, wherein a first lower portion of the sleeve bearing has a first outer diameter, and a first upper portion of the sleeve bearing has a second outer diameter greater than the first outer diameter; and a bearing holder having a second hollow portion for receiving the sleeve bearing and the shaft, and engaged with the motor base so as to hold the shaft in the motor base, wherein a second lower portion of the bearing holder has a first inner diameter greater than the first outer diameter so as to form a space between an outer surface of the sleeve bearing and an inner surface of the bearing holder for storing oil, and a second upper portion of the bearing holder has a second inner diameter approximately equal to the second outer diameter so as to form sealing for the space to prevent oil stored therein from leakage.

The bearing holder preferably includes a securing member mounted in the second lower portion thereof, and engaged with a first end portion of the sleeve bearing settled in the bearing holder for holding the sleeve bearing in the bearing holder, and positioning a second end portion of the shaft protruding from the first hollow portion of the sleeve bearing. In an embodiment, the securing member includes a plurality of plastic pieces separately arranged on the inner surface of the bearing holder under the sleeve bearing, so that the second end portion of the shaft is buckled in the oil sleeve bearing device by sliding downwards through the plastic pieces. Alternatively, the securing member includes a flexible ring which is contractible to allow the second end portion of the shaft to pass therethrough, and expandable to allow the second end portion to be positioned in the bearing holder.

Preferably, the bearing holder includes a plurality of rib elements separately arranged on the inner surface thereof, located in the second lower portion above the securing member, and having slant surfaces for guiding the sleeve bearing and the shaft to be engaged with the securing member.

More preferably, a partition member, e.g. a ring seal, is provided above the sleeve bearing to isolate the sleeve bearing from the external for further preventing oil stored in the bearing holder from leakage. In an embodiment, the ring seal is made of rubber, and has teeth on both an outer surface and an inner surface thereof for buffering oil leakage over the sleeve bearing from the space and the first hollow portion, respectively.

The bearing holder can be made of plastic.

According to a second aspect of the present invention, the oil sleeve bearing device includes a sleeve bearing having a first hollow portion for allowing the shaft to penetrate therethrough; a bearing holder having a second hollow portion for receiving the sleeve bearing and the shaft, and engaged with the motor base so as to hold the shaft in the motor base; and a securing member mounted in the second hollow portion under the sleeve bearing for holding the sleeve bearing in the bearing holder, and positioning an end portion of the shaft protruding from the first hollow portion; wherein there is a space among the sleeve bearing, the bearing holder, and the securing member for storing oil.

The oil sleeve bearing device preferably further includes a ring seal allowing the shaft to pass therethrough, and located above the sleeve bearing in the bearing holder for preventing oil stored in the bearing holder from leakage. The ring seal preferably has teeth on an outer surface thereof for buffering oil leakage over the sleeve bearing from the space.

According to a third aspect of the present invention, the shaft has a bullet-shaped head portion, and a recessed neck portion, and the oil sleeve bearing device includes a sleeve bearing having a first hollow portion for allowing the shaft to penetrate therethrough; a bearing holder having a second hollow portion for receiving the sleeve bearing and the shaft; and a plurality of elastic pieces located under the sleeve bearing and separately attached onto an inner surface of the bearing holder, so that the bullet-shaped head portion of the shaft is allowed to easily slide downwards through the elastic pieces so as to be buckled owing to the engagement of the recessed neck portion with the elastic pieces.

In a preferred embodiment, the bearing holder includes a plurality of rib elements separately arranged on the inner surface thereof, located above the elastic pieces, and having slant surfaces for guiding the shaft to pass through the elastic pieces.

According to a fourth aspect of the present invention, the shaft has a bullet-shaped head portion, and a recessed neck portion, and the oil sleeve bearing device includes a sleeve bearing having a first hollow portion for allowing the shaft to penetrate therethrough; a bearing holder having a second hollow portion for receiving the sleeve bearing and the shaft; and a flexible ring attached to an inner surface of the bearing holder, contractible to allow the bullet-shaped head portion of the shaft to pass therethrough, and expandable to fit the neck portion of the shaft so as to position the shaft in the bearing holder.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
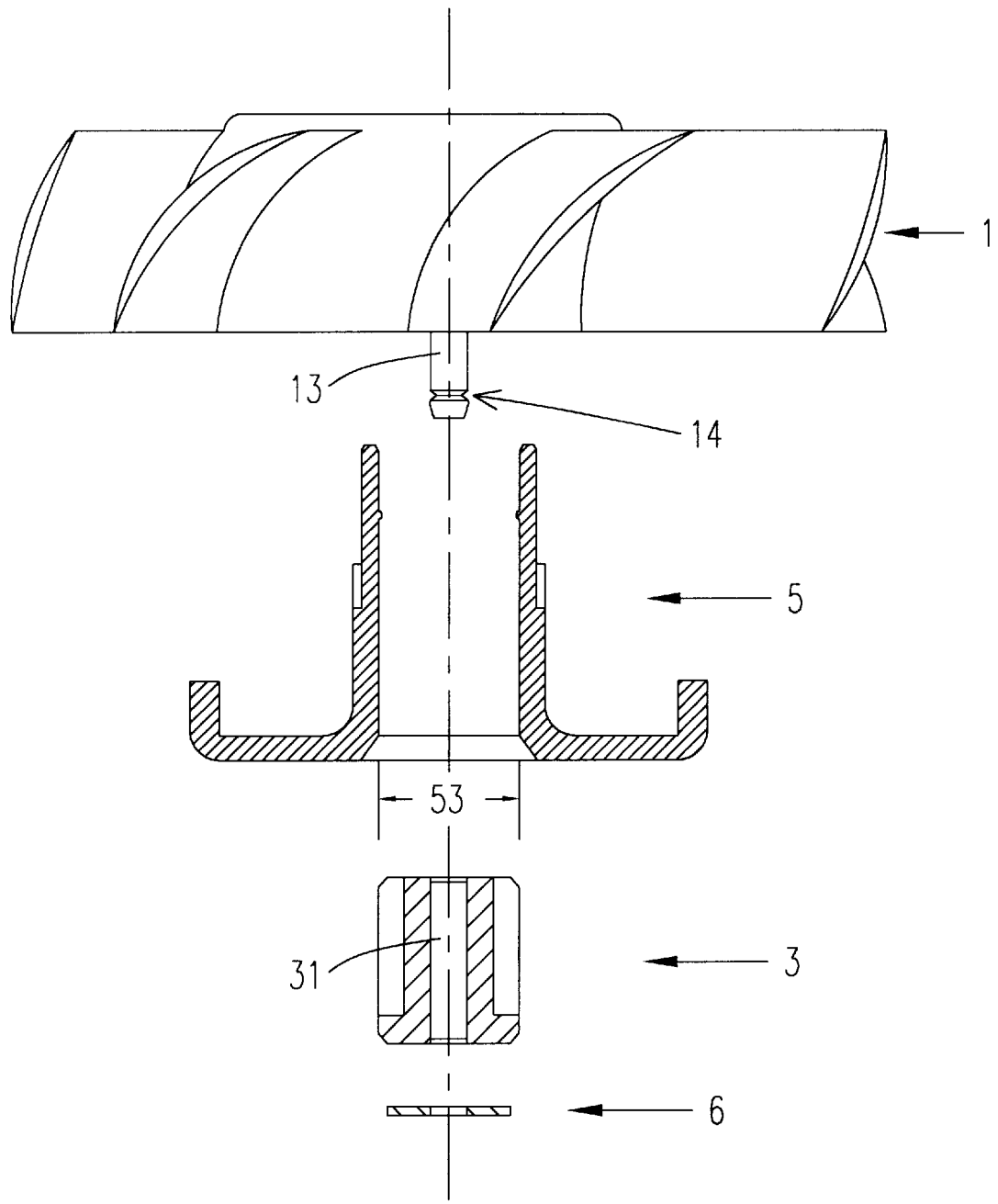
FIG. 1 is a schematic cross-sectional view of a conventional brush-free DC fan.
Figure 2:
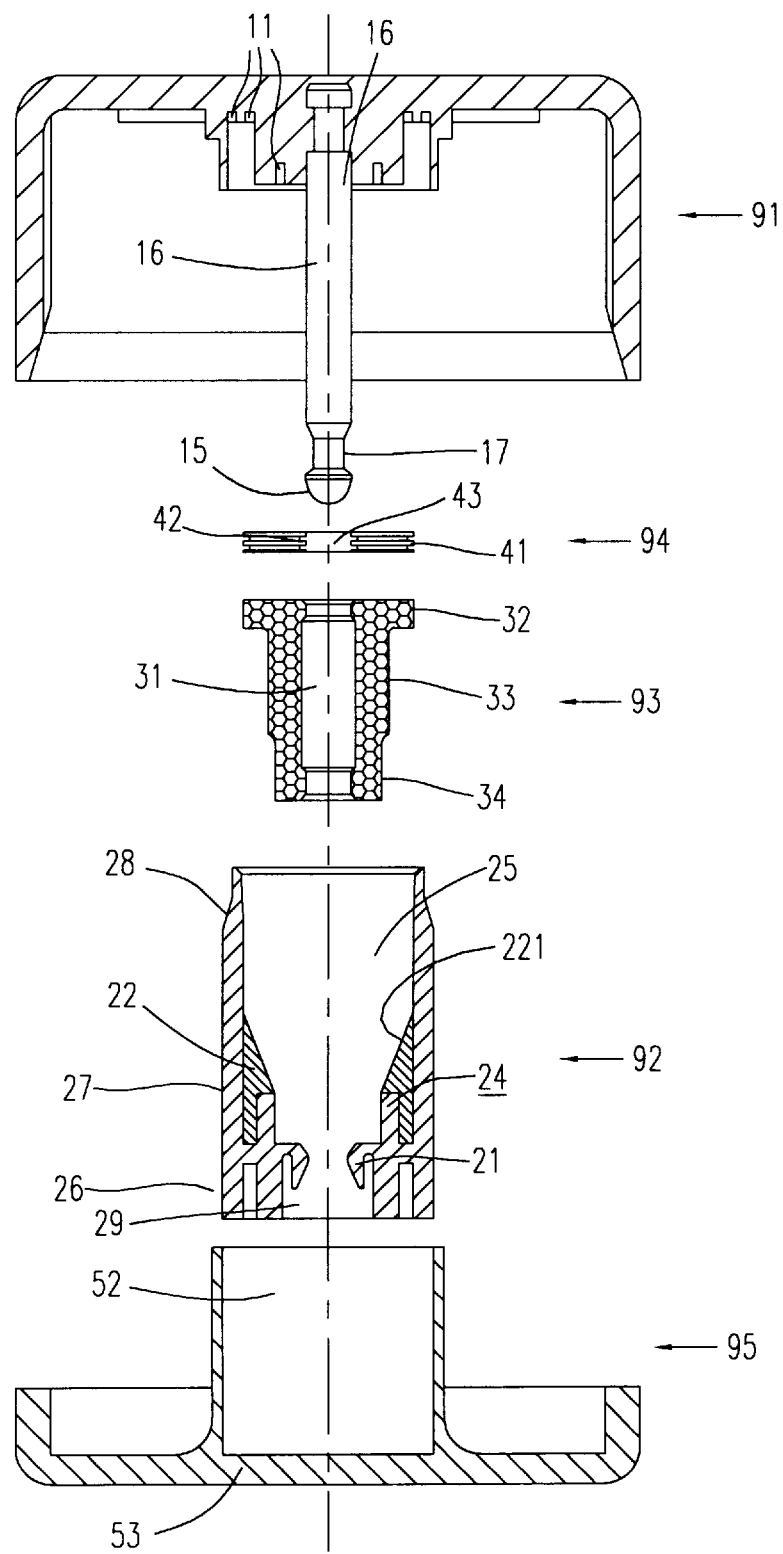
FIG. 2 is a disassembled cross-sectional view schematically showing diagram showing a preferred embodiment of an oil sleeve bearing device according to the present invention.
Figure 3:
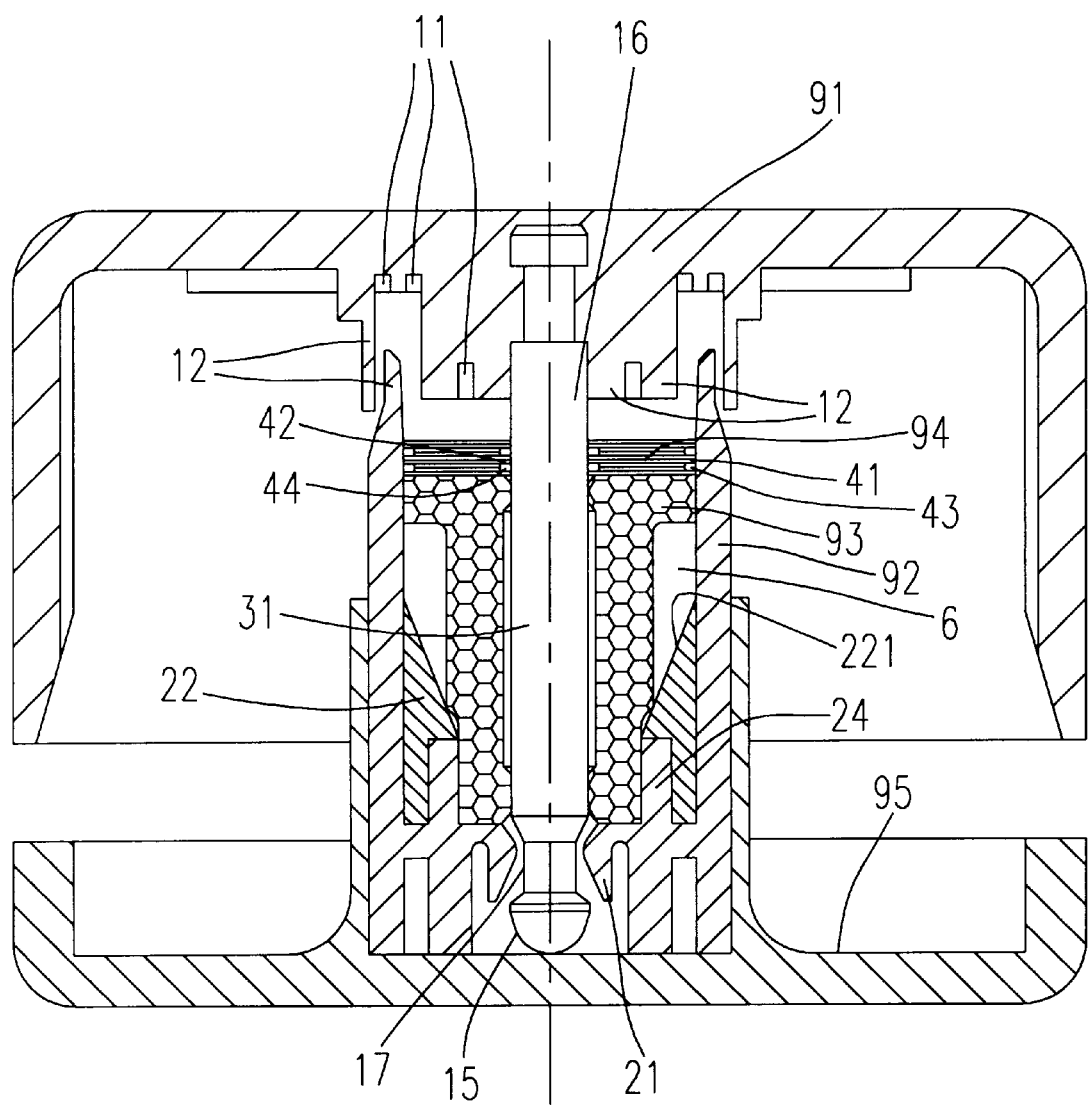
FIG. 3 is a schematic cross-sectional view showing an assembly of the oil sleeve bearing device of FIG. 2.

Please refer to FIGS. 2 and 3 which are schematic disassembled and assembled cross-sectional views of a preferred embodiment of an oil sleeve bearing device according to the present invention with a vane structure and a motor base of a DC fan. The oil sleeve bearing device includes a cylindrical bearing holder 92, a sleeve bearing 93, and a ring seal 94. When assembled, the bearing holder 92 is incorporated into the motor base 95, the sleeve bearing 93 is placed into the bearing holder 92, the ring seal 94 is also placed into the bearing holder 92 and located above the sleeve bearing 93, and then the shaft 16 of the vane portion 91 penetrates through the ring seal 93 and the sleeve bearing 93 and enters the bearing holder 92 to be positioned in the bearing holder 92. The structures of the above mentioned parts are respectively described as follows with reference to FIG. 2.

Vane Portion and Shaft

The shaft 16 extends from the vane portion 91, and has a bullet-shaped head 15 and a recessed neck 17. In the vane portion 91 near the shaft 16, a plurality of small trenches 11 are created.

Ring Seal

The ring seal 94 is made of rubber, and has a hollow cylindrical portion 43. The inner surface and the outer surface of the ring seal 94 both have a plurality of teeth 42 and 41, respectively.

Sleeve Bearing

The sleeve bearing 93 is made of copper-based material which has tiny pores inside, and can be formed by a powder sintering technique. The sleeve bearing 93 has a hollow cylindrical portion 31, and is divided into an upper portion 32, a lower portion 33, and an end portion 34. The outer diameter of the upper portion 32 is greater than that of the lower portion 33, and even greater than that of the end portion 34.

Bearing Holder

The bearing holder 92, preferably made of plastic, has a hollow cylindrical portion 25, and are divided into three portions, an upper portion 28, a lower portion 27 and an end portion 26. The upper portion 28 has an inner diameter approximately equal to the outer diameter of the upper portion 32 of the sleeve bearing 93. The lower portion 27 has an inner diameter greater than the outer diameter of the lower portion 33 of the sleeve bearing 93. In the end portion 26, a securing member 24 including a plurality of elastic pieces 21 is mounted on the inner surface of the bearing holder 92, and after installed therein the securing member 24, the residual inner diameter of a part of the end portion above the elastic pieces 21 is approximately equal to the outer diameter of the end portion 34 of the sleeve bearing 93. As for the smallest space 29 remained among the elastic pieces 21 should be slightly smaller than the size of the bullet-shaped head 15 of the shaft 16, and approximately equal to the size of the neck 17 of the shaft 16. In addition, a plurality of rib elements 22 having slant surfaces 221 are separately attached onto the inner surface of the bearing holder 92 in the lower portion 27.

Base

The base 95 has a hollow cylindrical portion 52 approximately equal to the outer diameter of the bearing holder 92, and it has a sealed bottom 53.

The assembling details are now illustrated with reference to FIGS. 2 and 3. When the bearing holder 92 is incorporated into the base 95, the bearing holder 92 is placed into the hollow portion 52 of the base 95, and the approximate equality of the diameters of the bearing holder 92 and the hollow portion 52 ensures the stability of the bearing holder 92 in the base 95.

When the sleeve bearing 93 is combined with the bearing holder 92, the sleeve bearing 93 is placed into the hollow portion 25 of the bearing holder 92, and positioned under the guidance of the rib elements 22. The end portion 34 of the sleeve bearing 93 slides downwards along the slant surfaces 221 of the rib elements 22, and is stopped by the securing member 24. The end portion 34 is closely engaged into the end portion 26 of the bearing holder 92 owing to the approximate equality of diameters. The upper portion 32 of the sleeve bearing 93 is in extremely close contact with the upper portion 28 of the bearing holder 92 owing to the approximate equality of diameters. The outer diameter of the lower portion 33 of the sleeve bearing 93 is less than the inner diameter of the lower portion 27 of the bearing holder 92 so that there is a space 6 existent between the sleeve bearing 93 and the bearing holder 92. The space 6 can be used to store oil which is supplied to the sleeve bearing 93 for maintaining durable lubrication for the revolution of the shaft 16. In addition, the space between every two rib elements which are separately arranged can also store oil therein.

Subsequently, the ring seal 94, preferably made of rubber, is placed into the bearing holder 92, and located immediately above the sleeve bearing 93. It can be seen from FIG. 3 that there is small vacant space 43 existent between the teeth 41 and the inner surface of the bearing holder 92. If oil leaks out from the room 6 and oozes out of the sleeve bearing 93, the vacant space 43 can buffer the oil leakage out of the oil sleeve bearing device.

Afterwards, the shaft 16 of the vane portion 91 penetrates through the hollow portions 43 and 31 of the ring seal 94 and the sleeve bearing 93, and enters the hollow portion 25 of the bearing holder 92. The shaft 16 slides downwards, and the bullet-shaped head 15 slightly pushes away the elastic pieces 21 so as to pass through the space 29. The neck 17 of the shaft 16 is then fitted with the elastic pieces 21 and positioned in the space 29. By the way, there is also small vacant space 44 existent between the teeth 42 and the outer surface of the shaft 16 so as to buffer oil leakage from the hollow portion 25 of the bearing holder 92.

Although the close contact between the upper portions 32 and 28 of the sleeve bearing 93 and bearing holder 92 and the arrangement of the ring seal 94 have provided excellent oil seal for the present oil sleeve bearing device, additional design in the vane portion 91 around the shaft 16 for further oil leakage prevention is suggested here. Trenches 11 as shown in FIG. 3 are provided so that leaking oil can be buffered by the alternately arranged trenches 11 and posts 12.

Figure 4:
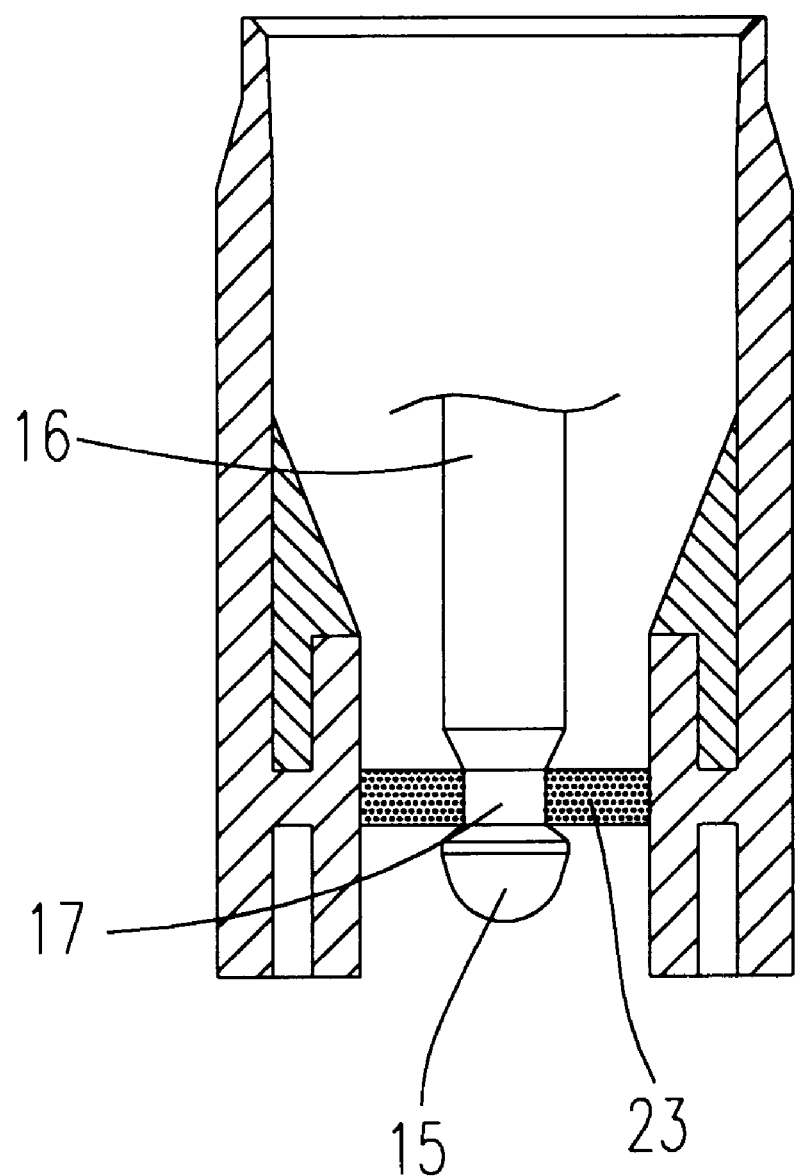
FIG. 4 is a schematic cross-sectional view showing another embodiment of the bearing holder according to the present invention.

It is understood that the numbers of the elastic pieces and the rib elements can be selected as required. Alternatively, the elastic pieces can be substituted by a flexible ring 23 which can contract owing to the squeezing of the bullet-shaped head 15 of the shaft 16, and then recover to original size to fit the neck 17 of the shaft 16, as shown in FIG. 4.

After the oil sleeve bearing device is assembled and combined with the vane portion, an oil-rinsing procedure under vacuum is performed to make oil introduced into the tiny pores of the sleeve bearing for lubrication and the room among the sleeve bearing, the bearing holder and the securing member for storing.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. In combination with a motor having a shaft and a motor base, an oil sleeve bearing device for permitting smooth revolving of said shaft therein, comprising:

a sleeve bearing having a first hollow portion for allowing said shaft to penetrate therethrough, wherein a first lower portion of said sleeve bearing has a first outer diameter, and a first upper portion of said sleeve bearing has a second outer diameter greater than said first outer diameter; and a bearing holder having a second hollow portion for receiving said sleeve bearing and said shaft, and a plurality of rib elements for guiding said sleeve bearing and said shaft into engagement with said bearing holder so as to hold said shaft in said motor base after said bearing holder is engaged with said motor base, wherein a second lower portion of said bearing holder has a first inner diameter greater than said first outer diameter so as to form a space between an outer surface of said sleeve bearing and an inner surface of said bearing holder for storing oil, and a second upper portion of said bearing holder has a second inner diameter approximately equal to said second outer diameter so as to form sealing for said space to reduce oil stored therein from leaking.

2. The oil sleeve bearing device according to claim 1 wherein said bearing holder includes a securing member mounted in said second lower portion thereof, and engaged with a first end portion of said sleeve bearing settled in said bearing holder for holding said sleeve bearing in said bearing holder, and positioning a second end portion of said shaft protruding from said first hollow portion of said sleeve bearing.

3. The oil sleeve bearing device according to claim 2 wherein said securing member includes a plurality of elastic pieces separately arranged on said inner surface of said bearing holder under said sleeve bearing, so that said second end portion of said shaft is buckled in said oil sleeve bearing device by sliding downwards through said elastic pieces.

4. The oil sleeve bearing device according to claim 3 wherein said elastic pieces are made of plastic.

5. The oil sleeve bearing device according to claim 2 wherein said securing member includes a flexible ring which is contractible to allow said second end portion of said shaft to pass therethrough, and expandable to allow said second end portion to be positioned in said bearing holder.

6. The oil sleeve bearing device according to claim 2 wherein said plurality of rib elements of said bearing holder are separately arranged on said inner surface thereof and located in said second lower portion above said securing member, and have slanted surfaces for guiding said sleeve bearing and said shaft into engagement with said securing member.

7. The oil sleeve bearing device according to claim 1 further comprising a ring seal allowing said shaft to pass therethrough, and located above said sleeve bearing in said bearing holder for further preventing oil stored in said bearing holder from leaking.

8. The oil sleeve bearing device according to claim 7 wherein said ring seal has teeth on an outer surface thereof for buffering oil from leaking over said sleeve bearing from said space.

9. The oil sleeve bearing device according to claim 8 wherein said ring seal further has teeth on an inner surface thereof for buffering oil from leaking over said sleeve bearing from said first hollow portion.

10. The oil sleeve bearing device according to claim 7 wherein said ring seal is made of rubber.

11. The oil sleeve bearing device according to claim 1 wherein said bearing holder is made of plastic.

12. In combination with a motor having a shaft and a motor base, an oil sleeve bearing device for permitting smooth revolving of said shaft therein, comprising:

a sleeve bearing having a first hollow portion for allowing said shaft to penetrate therethrough;

a bearing holder having a second hollow portion for receiving said sleeve bearing and said shaft, and engaged with said motor base so as to hold said shaft in said motor base;

a securing member mounted in said second hollow portion under said sleeve bearing for holding said sleeve bearing in said bearing holder, and positioning an end portion of said shaft protruding from said first hollow portion; and a plurality of rib elements separately arranged on an inner surface of said bearing holder, located in said second lower portion above said securing member, and having slanted surfaces for guiding said sleeve bearing and said shaft into engagement with said securing member;

wherein there is a space among said sleeve bearing, said bearing holder, and said securing member for storing oil.

13. The oil sleeve bearing device according to claim 12 further comprising a partition member located in said bearing holder above said sleeve bearing for isolating said sleeve bearing from the environment so as to prevent oil stored in said bearing holder from leaking.

14. The oil sleeve bearing device according to claim 13 wherein said partition member is a ring seal allowing said shaft to pass therethrough.

15. The oil sleeve bearing device according to claim 14 wherein said ring seal has teeth on an outer surface thereof for buffering oil from leaking over said sleeve bearing from said space.

16. The oil sleeve bearing device according to claim 12 wherein said shaft has a bullet-shaped head portion and a recessed neck portion, and said securing member includes a plurality of elastic pieces separately attached onto an inner surface of said bearing holder, so that said bullet-shaped head portion of said shaft is allowed to easily slide downwards through said elastic pieces so as to be buckled in said oil sleeve bearing device due to the engagement of said recessed neck portion with said elastic pieces.

17. In combination with a shaft having a bullet-shaped head portion and a recessed neck portion, an oil sleeve bearing device comprising:

a sleeve bearing having a first hollow portion for allowing said shaft to penetrate therethrough;

a bearing holder having a second hollow portion for receiving said sleeve bearing and said shaft, and having a plurality of rib elements for guiding said shaft to pass through said bearing holder; and a plurality of elastic pieces located under said sleeve bearing and separately attached onto an inner surface of said bearing holder, so that said bullet-shaped head portion of said shaft is allowed to slide downwards through said elastic pieces so as to be buckled owing to the engagement of said recessed neck portion with said elastic pieces.

18. The oil sleeve bearing device according to claim 17 wherein said plurality of rib elements of said bearing holder are separately arranged on said inner surface thereof and located above said elastic pieces, and have slanted surfaces for guiding said shaft to pass through said elastic pieces.

19. The oil sleeve bearing device according to claim 17 further comprising a ring seal allowing said shaft to pass therethrough, and located above said sleeve bearing in said bearing holder for preventing oil in said bearing holder from leaking.

20. The oil sleeve bearing device according to claim 19 wherein said ring seal has teeth on an inner surface thereof for buffering oil from leaking over said sleeve bearing from said first hollow portion.

21. The oil sleeve bearing device according to claim 19 wherein said shaft positions therearound a plurality of posts and trenches for buffering oil leakage over said sleeve bearing.

* * * * *